United States Patent [19]
Broune

[11] 4,100,689
[45] Jul. 18, 1978

[54] TRANSACTION CARD
[76] Inventor: Abel U. Broune, 1950 S. Ocean Dr., Hallandale, Fla. 33009
[21] Appl. No.: 598,889
[22] Filed: Jul. 24, 1975
[51] Int. Cl.² ............................................. G09F 3/02
[52] U.S. Cl. ........................................ 40/2.2; 40/495
[58] Field of Search ............................ 40/2.2, 70 R
[56] References Cited

U.S. PATENT DOCUMENTS

| | | | |
|---|---|---|---|
| 1,075,256 | 10/1913 | Hutchinson | 40/70 R |
| 1,495,158 | 5/1924 | Burnham | 40/70 R |
| 1,764,063 | 6/1930 | Youngberg | 40/70 R |
| 3,399,473 | 9/1968 | Jaffe | 40/2.2 |
| 3,624,938 | 12/1971 | Richard | 40/2.2 |
| 3,762,081 | 10/1973 | Armbruster | 40/2.2 |

*Primary Examiner*—Louis G. Mancene
*Assistant Examiner*—Wenceslao J. Contreras

[57] ABSTRACT

A credit card or the like having permanent indicia thereon for designating an authorized user of the card and one or more rotatably adjustable discs with coded indicia thereon which may be viewed through a window in the card to complete a coded designation of authorized use.

1 Claim, 6 Drawing Figures

TRANSACTION CARD

BACKGROUND OF THE INVENTION

Various credit cards and the like have been used heretofore which have permanent indicia thereon for designating an authorized user of the card. Typically, the card has its own "number", which may consist of a series of numerals or numerals and letters, and the name (and sometimes the address) of the authorized user. In many cases a line is provided for the authorized user's signature.

In actual practice the card may become lost or stolen and an unauthorized person may present it when making a credit purchase or other transaction. If the signature on the card is not carefully checked against the signature of the person presenting it, and often a sales clerk fails to do this, then a fraudulent transaction may be consummated, with resultant financial loss to either the authorized user of the card or the seller or both.

The same problem may arise in connection with an employee-identification card, where an unauthorized person may gain admission to an office or factory area because of a guard's failure to check the photograph, signature or other unique employee-identification feature on the card.

SUMMARY OF THE INVENTION

The present invention is directed to a novel and improved transaction card, such as a credit card, which provides an additional coded feature that would not be known to a person who stole or found the card. When the card is presented, the designation of authorized use is not complete unless the additional code is properly displayed.

Prefereably, the additional code is provided by one or more discs rotatably mounted on the card behind one or more windows in the card. The disc carries a series of coded indicia, such as letters, numbers, or letters and numbers, which are selectively displayed at the window depending upon the rotational position to which the disc has been turned.

A principal object of this invention is to provide a transaction card, such as a credit card, having a novel arrangement for guarding against fraudulent or otherwise unauthorized use of the card.

Further objects and advantages of this invention will be apparent from the following detailed description of two presently-preferred embodiments thereof, which are shown in the accompanying drawing in which.

Before explaining the diclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIGS. 1-4, the credit card shown there is thin, flat, and generally rectangular with permanent indicia embossed or otherwise imprinted on the front face 10 which designate: (1) the name of the organization which issued the card; (2) the number of the individual card; and (3) the name of the authorized user of the card. In addition, the card is shown as having a line for the authorized user's signature. As described thus far, the card is conventional.

Figure 1:
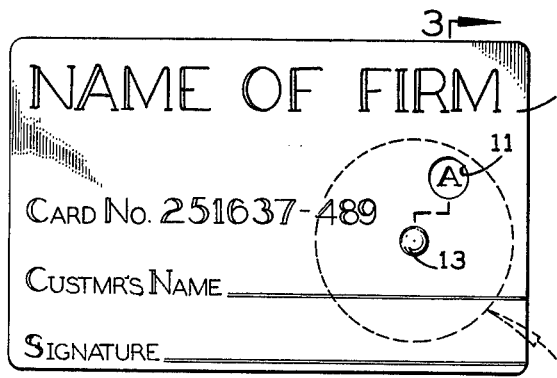
FIG. 1 is a front view of a credit card in accordance with a first embodiment of this invention.
Figure 2:
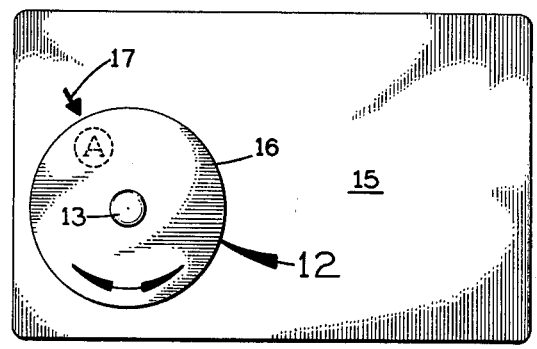
FIG. 2 is a plan view of the back of this card.
Figure 3:
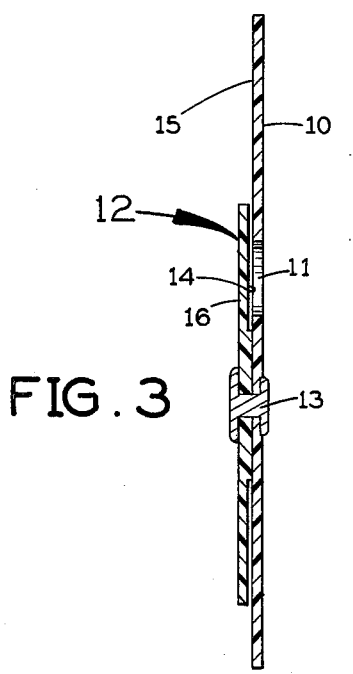
FIG. 3 is a cross-section taken along the line 3—3 in FIG. 1.
Figure 4:
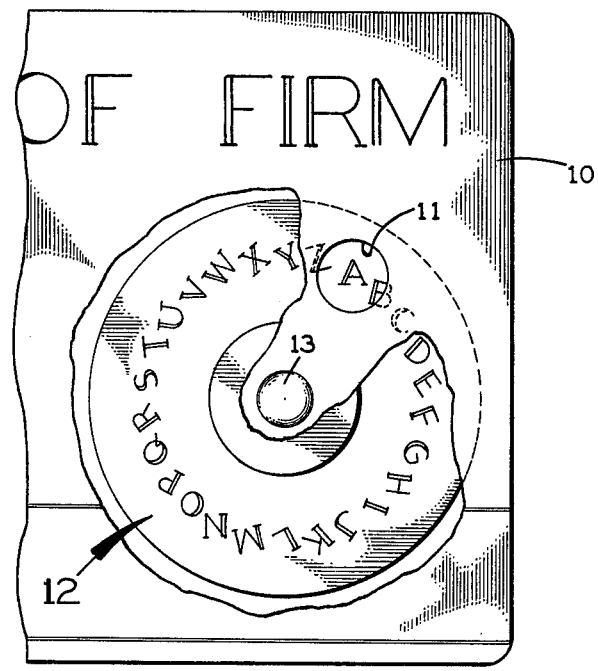
FIG. 4 is an enlarged plan view of a portion of the card at the front, with certain parts broken away for clarity.

In accordance with the present invention, the card is provided with a small window 11 which, as shown in FIG. 3, may be simply a circular opening in the card. A thin, flat, circular disc 12 is rotatably mounted on the back of the card by means of a rivet 13 or the like at the center of the disc. The disc carries a series of coded indicia arranged in a circle on the front face 14 of the disc immediately behind the back face 15 of the card. These indicia are visible one at a time from the front of the card through the window 11 in the latter.

In the particular embodiment shown in FIGS. 1-4, these coded indicia are the letters of the English alphabet from A to Z. However, it is to be understood that the indicia may be numerals, or both letters and numerals, or some other form of indicia.

The same indicia are printed on the backface 16 of the disc 12 at the same positions as the indicia on the front face 14. An arrow 17 is permanently imprinted or embossed on the backface 15 of the card 10. This arrow points to the same letter on the back of the disc as the letter on the front of the disc which appears at the window 11. Therefore, this coded designation can be read either from the front of the card at the window 11 or from the back of the card at the arrow.

When the authorized user presents the credit card for purposes of making a transaction, he turns the disc 12 so that the correct letter is visible from the front at the window 11 and from the back at the arrow 17. This letter is known to him and it will be verifiable by the sales clerk or other person seeking to determine whether the person presenting the card is the authorized user. However, the code would not be known to an unauthorized holder of the card, and except when using the card during a transaction the authorized user will have turned the disc 12 so that an incorrect letter appears at the window 11 and at the arrow 17. If presented with an incorrect letter visible at the window and at the arrow, the sales clerk should decline to complete the transaction and would be alerted to the likelihood that the person presenting the card is not the authorized user and may, in fact, have stolen it.

Figure 5:
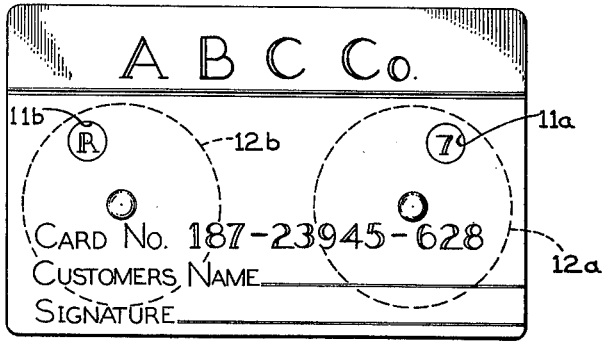
FIG. 5 is a front view of a credit card in accordance with a second embodiment of the present invention.
Figure 6:
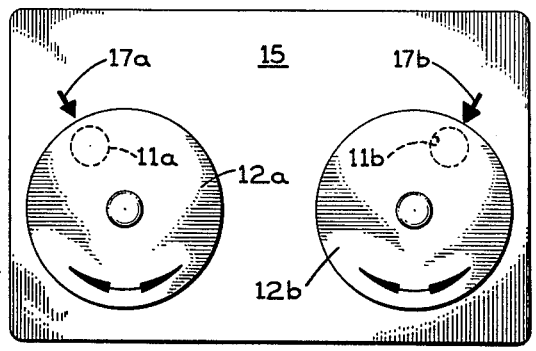
FIG. 6 is a back view of the FIG. 5 card.

In the second embodiment of the invention shown in FIGS. 5 and 6, two windows 11a and 11b are provided in the card, and two rotatable discs 12a and 12b are mounted on the back of the card near the beginning and the end, respectively, of the permanent card number on the front of the card. Each disc is adjustable rotatively to position a particular letter or number on the front of the disc at the corresponding window 11a or 11b in the card. The combination of the two disc indicia at the two windows must correspond to the correct code in order for the card to be accepted in a transaction. Two arrows 17a and 17b on the back of the card point to indicia on the back of the discs 12a and 12b which are the same as the indicia appearing at the windows 11a and 11b. Therefore, either these arrows or the windows can be used to read the coded indicia on the discs.

I claim:

1. In a transaction card (1) having permanent indicia on the front providing part of the coded designation of an authorized user, the improvement which comprises: means providing a window in said card and (2) a disc rotatably mounted on the back of the card said disc carrying on its front face a circularly arranged series of visual indicia which registers individually in succession with said window as the disc is turned for viewing said window from the front of the card, a selected one of said indicia on the disc when visible through said window completing the coded designation of the authorized user and said disc having said indicia on the front for viewing through said window has the same indicia at the same positions on the back and said card has a mark on the back pointing to the indicium on the back of the disc which is the same as the indicium on the front of the disc that is visible at said window.

* * * * *